US011280289B2

(12) United States Patent
Toya

(10) Patent No.: US 11,280,289 B2
(45) Date of Patent: Mar. 22, 2022

(54) INTERNAL COMBUSTION ENGINE CONTROL SYSTEM

(71) Applicant: TOYOTA JIDOSHA KABUSHIKI KAISHA, Toyota (JP)

(72) Inventor: Masanori Toya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/130,925

(22) Filed: Dec. 22, 2020

(65) Prior Publication Data

US 2021/0231075 A1 Jul. 29, 2021

(30) Foreign Application Priority Data

Jan. 24, 2020 (JP) ............................. JP2020-010017

(51) Int. Cl.
*F02D 41/22* (2006.01)
*F02D 41/14* (2006.01)
*F02D 41/18* (2006.01)

(52) U.S. Cl.
CPC ....... *F02D 41/222* (2013.01); *F02D 41/1441* (2013.01); *F02D 41/1446* (2013.01); *F02D 41/18* (2013.01); *F02D 2200/0414* (2013.01)

(58) Field of Classification Search
CPC .... F02D 41/222; F02D 41/18; F02D 41/1441; F02D 41/1446; F02D 2200/0414
See application file for complete search history.

(56) References Cited

U.S. PATENT DOCUMENTS

| 4,690,120 A | * | 9/1987 | Egle | F02B 47/08 123/568.16 |
| 5,014,203 A | * | 5/1991 | Miyazaki | F02M 26/55 123/568.16 |
| 5,349,936 A | * | 9/1994 | Uchinami | F02M 26/48 123/676 |
| 5,474,051 A | * | 12/1995 | Matsumoto | F02M 26/49 123/568.16 |
| 5,727,533 A | * | 3/1998 | Bidner | F02D 21/08 123/568.16 |

(Continued)

FOREIGN PATENT DOCUMENTS

JP 2008267335 A * 11/2008
JP 2016-000982 A 1/2016

*Primary Examiner* — Joseph J Dallo
(74) *Attorney, Agent, or Firm* — Finnegan, Henderson, Farabow, Garrett & Dunner, LLP

(57) ABSTRACT

An internal combustion engine is equipped with a downstream temperature sensor arranged in an intake passage, an upstream temperature sensor arranged in the intake passage upstream of the downstream temperature sensor, an EGR temperature sensor arranged in an EGR passage, and an airflow meter arranged in the intake passage. A control device corrects a temperature detected by each of the temperature sensors based on an amount of deviation of the temperature detected by that one of the temperature sensors upon activation of the control device after the lapse of a prescribed time or more since stoppage of the internal combustion engine from a reference temperature. Then, the control device calculates a flow rate of EGR gas based on the corrected temperature of that one of the temperature sensors and a flow rate of intake air, and detects the clogging of the EGR passage based on the flow rate.

7 Claims, 2 Drawing Sheets

(56) References Cited

U.S. PATENT DOCUMENTS

| | | | | | |
|---|---|---|---|---|---|
| 5,771,869 | A | * | 6/1998 | Yoshihara | F02M 26/49 123/568.16 |
| 6,035,835 | A | * | 3/2000 | Shigihama | F02M 26/57 123/568.16 |
| 6,079,387 | A | * | 6/2000 | Mamiya | F02D 33/00 123/295 |
| 6,164,270 | A | * | 12/2000 | Bidner | F02D 21/08 123/568.16 |
| 6,192,866 | B1 | * | 2/2001 | Araki | F02D 41/222 123/479 |
| 6,467,469 | B2 | * | 10/2002 | Yang | F02D 41/0077 123/568.21 |
| 6,539,785 | B1 | * | 4/2003 | Nagaishi | F02D 41/18 73/114.79 |
| 6,837,226 | B2 | * | 1/2005 | Wang | F02M 26/48 123/568.16 |
| 7,376,520 | B2 | * | 5/2008 | Wong | G01F 1/34 702/45 |
| 7,404,291 | B2 | * | 7/2008 | Endo | F01N 13/009 60/297 |
| 7,739,027 | B2 | * | 6/2010 | Kang | F02D 13/0219 701/108 |
| 8,490,601 | B2 | * | 7/2013 | Recouvreur | G01K 7/42 123/479 |
| 10,330,034 | B2 | * | 6/2019 | Brewbaker | F02D 41/18 |
| 10,876,444 | B2 | * | 12/2020 | Chen | F01M 13/0011 |
| 2014/0014079 | A1 | * | 1/2014 | Yacoub | F02D 41/144 123/568.16 |
| 2015/0033735 | A1 | * | 2/2015 | Makki | F02D 41/0072 60/605.2 |
| 2017/0089279 | A1 | * | 3/2017 | Yoeda | F02M 26/47 |
| 2017/0096959 | A1 | * | 4/2017 | Kaneko | F02D 41/3017 |

* cited by examiner

INTERNAL COMBUSTION ENGINE CONTROL SYSTEM

CROSS-REFERENCE TO RELATED APPLICATION

This application claims priority to Japanese Patent Application No. 2020-010017 filed on Jan. 24, 2020, incorporated herein by reference in its entirety.

BACKGROUND

1. Technical Field

This disclosure relates to an internal combustion engine control system.

2. Description of Related Art

In an internal combustion engine disclosed in Japanese Unexamined Patent Application Publication No. 2016-000982 (JP 2016-000982 A), an EGR passage for recirculating exhaust gas to an intake passage extends from an exhaust passage. The EGR passage is connected to the intake passage. A control device of this internal combustion engine estimates a flow rate of EGR gas as exhaust gas returned to the intake passage through the EGR passage, based on detected values of a pressure sensor and a temperature sensor that are provided in the intake passage. Then, abnormalities in the intake passage and the exhaust passage are diagnosed based on the estimated flow rate of EGR gas.

SUMMARY

Due to the circumstances such as the type and structure of the internal combustion engine, it may be impossible to install the pressure sensor at a location suited to estimate the flow rate of EGR gas. In the art of estimating the flow rate of EGR gas through the use of both the detected values of the pressure sensor and the temperature sensor as in JP 2016-000982 A, in the case where the pressure sensor cannot be installed at an appropriate location, the flow rate of EGR gas cannot be calculated or the accuracy of the flow rate of EGR gas cannot be guaranteed even if calculation thereof is possible.

An internal combustion engine control system for solving the aforementioned problem is equipped with an internal combustion engine, and a control device that controls the internal combustion engine. The internal combustion engine is equipped with an EGR passage that extends from an exhaust passage and that is connected to an intake passage downstream of a throttle valve, a downstream temperature sensor that detects a temperature of intake air in the intake passage in a region downstream of the throttle valve, an upstream temperature sensor that detects a temperature of intake air in the intake passage in a region upstream of the downstream temperature sensor, an EGR temperature sensor that detects a temperature of EGR gas as exhaust gas returned to the intake passage through the EGR passage, and an airflow meter that detects a flow rate of intake air introduced into the intake passage. The control device is equipped, when the downstream temperature sensor, the upstream temperature sensor, and the EGR temperature sensor are referred to as mounted temperature sensors, with a correction value calculation unit that calculates a correction temperature of each of the mounted temperature sensors based on an amount of deviation of a temperature detected by that one of the mounted temperature sensors at a predetermined timing between activation of the control device and startup of the internal combustion engine by the control device after the lapse of a prescribed time or more since stoppage of the internal combustion engine, from a reference temperature determined as a temperature of air outside a vehicle, a temperature correction unit that calculates a corrected temperature of that one of the mounted temperature sensors by correcting the temperature detected by that one of the mounted temperature sensors by the correction temperature of that one of the mounted temperature sensors during operation of the internal combustion engine, a gas amount calculation unit that calculates an estimated EGR gas amount as an estimated value of a flow rate of the EGR gas, based on the corrected temperature of that one of the mounted temperature sensors and the flow rate of intake air, and a clogging detection unit that detects the clogging of the EGR passage based on a difference between a target EGR gas amount as a target value of the flow rate of the EGR gas and the estimated EGR gas amount, when the target EGR gas amount is equal to or larger than a predetermined amount.

After the lapse of the prescribed time or more since stoppage of the internal combustion engine, the intake passage and the EGR passage are sufficiently cooled. Then, the temperature of the intake passage and the temperature of the EGR passage become approximately equal to an outside air temperature. That is, all the temperatures of the locations where the temperature sensors are arranged respectively ought to be equal to one another. The amount of deviation of the temperature detected by each of the mounted temperature sensors under this situation from the reference temperature is a value reflecting an error in that one of the mounted temperature sensors resulting from an individual difference thereof. In the foregoing configuration, the corrected temperature is calculated by correcting the error in the detected temperature by the correction value based on this amount of deviation. The estimated EGR amount can be accurately calculated by calculating the estimated EGR amount through the use of this corrected temperature. Accordingly, the clogging of the EGR passage can be accurately detected.

In the internal combustion engine control system, the gas amount calculation unit may calculate the estimated EGR gas amount based on a value obtained by dividing a product of the flow rate of intake air and a value obtained by subtracting the corrected temperature of the upstream temperature sensor from the corrected temperature of the downstream temperature sensor, by a value obtained by subtracting the corrected temperature of the downstream temperature sensor from the corrected temperature of the EGR temperature sensor.

As a thermal relationship in mixing the EGR gas returned to the intake passage with intake air, there is established a relationship indicating that the amount of heat received by intake air from EGR gas and the amount of heat dissipated by EGR gas are equal to each other. It should be noted herein that the corrected temperature of the downstream temperature sensor reflects a temperature in a state where EGR gas is mixed with intake air. The corrected temperature of the upstream temperature sensor reflects a temperature before mixing EGR gas with intake air. The corrected temperature of the EGR temperature sensor reflects a temperature of EGR gas that has not been mixed with intake air yet. The amount of heat received by intake air from EGR gas and the amount of heat dissipated by EGR gas can be expressed through the use of these temperatures, the flow rate of intake air, and the amount of EGR gas.

In the foregoing configuration, the estimated EGR gas amount is calculated based on the foregoing thermal relationship regarding the mixing of intake air and EGR gas, through the use of the corrected temperature of each of the mounted temperature sensors and the flow rate of intake air. Accordingly, the accuracy in calculating the estimated EGR gas amount is high.

In the internal combustion engine of the internal combustion engine system, a supercharger may be provided across the intake passage and the exhaust passage, the EGR passage may extend from the exhaust passage upstream of a turbine of the supercharger, an EGR valve that adjusts the flow rate of the EGR gas flowing through the EGR passage may be provided midway in the EGR passage, an EGR cooler that cools the EGR gas flowing through the EGR passage may be provided in the EGR passage on the intake passage side from the EGR valve, and the EGR temperature sensor may be provided in the EGR passage on the intake passage side from the EGR cooler.

If the EGR valve is arranged in the EGR passage on the intake passage side from the EGR cooler, the region of the EGR passage on the exhaust passage side from the EGR valve includes the EGR cooler, and hence has a large volume. In this case, when the EGR valve is closed, gas is allowed to pulsate in the EGR passage in the region located on the exhaust passage side from the EGR valve. When this pulsation is transferred to the turbine in the exhaust passage, the turbine is prevented from rotating, and the supercharging efficiency falls. In the foregoing configuration, the EGR valve is arranged in the EGR passage on the exhaust passage side from the EGR cooler, so the supercharging efficiency can be kept from falling.

Incidentally, when the EGR valve is arranged in the EGR passage on the exhaust passage side from the EGR cooler, the temperature of the environment surrounding the EGR valve is very high. Therefore, even if an attempt is made to arrange the pressure sensor around the EGR valve with a view to estimating the amount of EGR gas through the use of a differential pressure across the EGR valve serving as a throttle portion of the EGR passage, it is difficult to install the pressure sensor because the pressure sensor is required to exhibit high heat resistance.

In this respect, when the estimated EGR gas amount is calculated through the use of the temperatures, there is no restriction on the position of the EGR temperature sensor with respect to the position of the EGR valve. Therefore, the EGR temperature sensor can be arranged in the EGR passage on the intake passage side from the EGR cooler, as in the foregoing configuration. In this case, the EGR temperature sensor is not required to exhibit heat resistance. Moreover, when the EGR temperature sensor is arranged in the EGR passage on the intake passage side from the EGR cooler, the temperature of EGR gas that has been cooled by the EGR cooler and that has not been mixed with intake air yet can be detected. Therefore, the foregoing configuration is preferred when the estimated EGR amount is calculated based on the thermal relationship resulting from the mixing of intake air and EGR gas.

In the internal combustion engine of the internal combustion engine control system, an intercooler that cools intake air may be provided in the intake passage downstream of a compressor of the supercharger and upstream of the throttle valve, and the upstream temperature sensor may be provided in the intake passage downstream of the intercooler.

In the foregoing configuration, the temperature of intake air that has been cooled by the intercooler and with which EGR gas has not been mixed yet can be detected. This configuration is preferred when the estimated EGR amount is calculated based on the thermal relationship resulting from the mixing of intake air and EGR gas.

In the internal combustion engine control system, the reference temperature may be a median of the temperature detected by the downstream temperature sensor, the temperature detected by the upstream temperature sensor, and the temperature detected by the EGR temperature sensor at the predetermined timing after the lapse of the prescribed time or more since stoppage of the internal combustion engine.

In the aforementioned configuration, the temperature detected by one of the three mounted temperature sensors is adopted as the reference temperature. In this case, even if there are reasonably large errors in the other two mounted temperature sensors respectively, the reference temperature is not affected by those errors. Therefore, the error in the reference temperature with respect to the actual temperature of air outside the vehicle can be made small.

In the internal combustion engine control system, the reference temperature may be an average of the temperature detected by the downstream temperature sensor, the temperature detected by the upstream temperature sensor, and the temperature detected by the EGR temperature sensor at the predetermined timing after the lapse of the prescribed time or more since stoppage of the internal combustion engine.

The average of the temperatures detected by the three mounted temperature sensors is likely to make the errors in the three mounted temperature sensors counterbalance one another. Thus, the error in the reference temperature with respect to the actual temperature of air outside the vehicle can be made small.

In the internal combustion engine control system, the reference temperature may be the temperature detected by a minimum tolerance temperature sensor at the predetermined timing after the lapse of the prescribed time or more since stoppage of the internal combustion engine, when the minimum tolerance temperature sensor is defined as a temperature sensor with a lowest product tolerance among the downstream temperature sensor, the upstream temperature sensor, and the EGR temperature sensor.

The error in the minimum tolerance temperature sensor is likely to be small. When the temperature detected by this temperature sensor is adopted as the reference temperature, the error in the reference temperature with respect to the actual temperature of air outside the vehicle can be made small.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
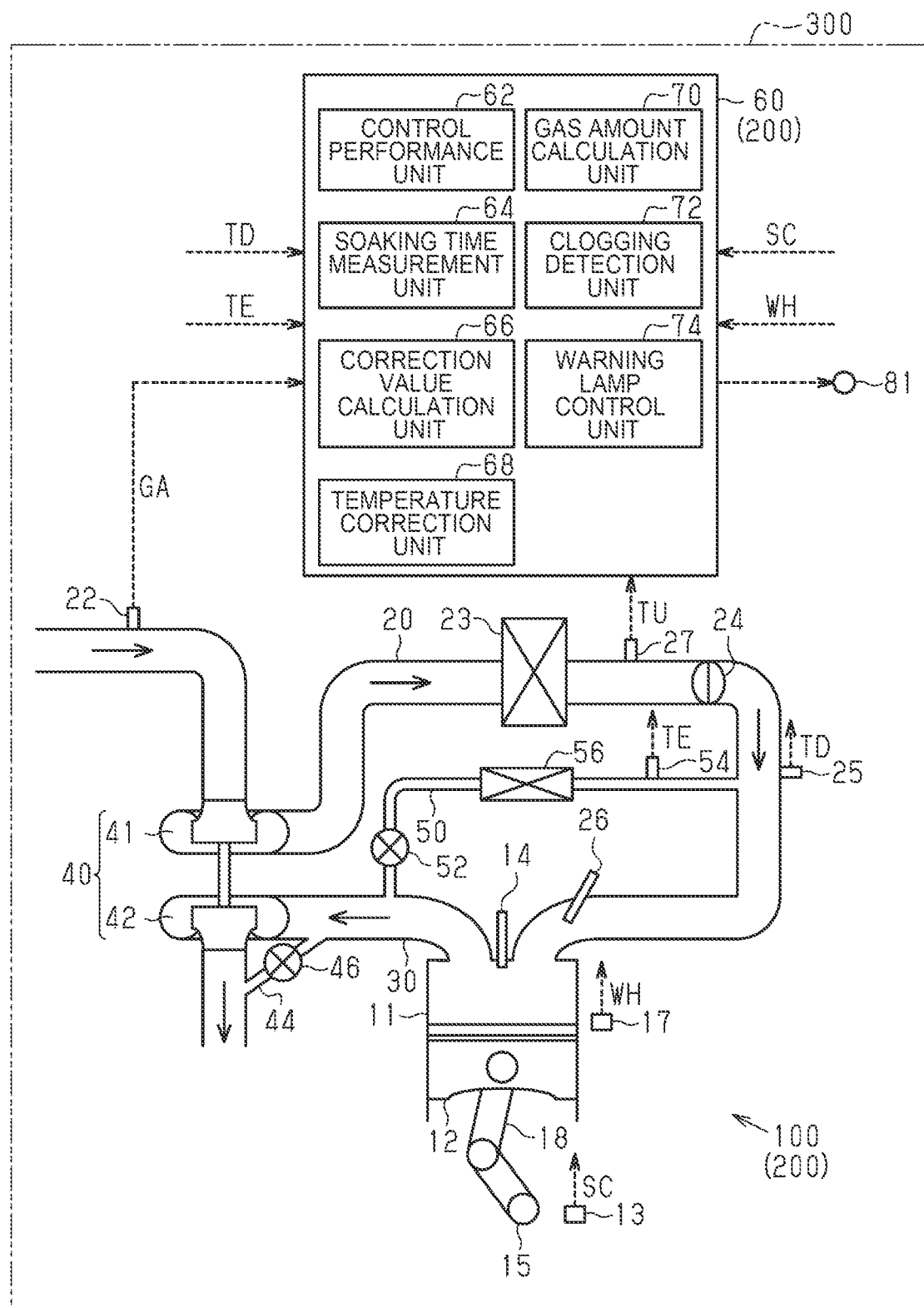
FIG. 1 is a schematic configuration view of an internal combustion engine.

An internal combustion engine control system according to one of the embodiments will be described hereinafter with reference to the drawings. First of all, the schematic configuration of an internal combustion engine will be described. As shown in FIG. 1, a vehicle 300 is mounted with an internal combustion engine control system 200. The internal combustion engine control system 200 has an internal combustion engine 100 that serves as a driving source of the vehicle 300, and a control device 60 that controls the internal combustion engine 100.

Cylinders 11 in which a mixture of fuel and intake air is burned are defined in the internal combustion engine 100. Although the internal combustion engine 100 is provided with the cylinders 11, only one of the cylinders 11 is shown in FIG. 1. A piston 12 is accommodated in the cylinder 11 movably in a reciprocating manner. The piston 12 is coupled to a crankshaft 15 via a connecting rod 18. Reciprocating motion of the piston 12 is converted into rotary motion of the crankshaft 15 via the connecting rod 18. A crank angle sensor 13 that detects a rotational position of the crankshaft 15 as a detected crank position SC is arranged in the vicinity of the crankshaft 15.

In the internal combustion engine 100, an ignition plug 14 that ignites the air-fuel mixture in the cylinder 11 is installed. A tip of the ignition plug 14 is located in the cylinder 11. Besides, an intake passage 20 for introducing intake air from the outside into the cylinder 11 is connected to the cylinder 11. An exhaust passage 30 for discharging exhaust gas from inside the cylinder 11 is also connected to the cylinder 11.

A supercharger 40 is attached to the intake passage 20 and the exhaust passage 30 in such a manner as to extend across both the intake passage 20 and the exhaust passage 30. A compressor 41 of the supercharger 40 is arranged in the intake passage 20. A turbine 42 of the supercharger 40 is arranged in the exhaust passage 30. The compressor 41 and the turbine 42 are coaxially coupled to each other. When the turbine 42 rotates as exhaust gas flows, the compressor 41 rotates integrally with the turbine 42 to supercharge intake air.

An airflow meter 22 that detects a flow rate of intake air introduced into the intake passage 20 as a detected intake air amount GA is attached to the intake passage 20 upstream of the compressor 41 of the supercharger 40 with respect to the flow of intake air. The detected intake air amount GA is an amount of intake air passing through a unit area per unit time. An intercooler 23 that cools intake air is arranged in the intake passage 20 downstream of the compressor 41 with respect to the flow of intake air. An upstream temperature sensor 27 is attached to the intake passage 20 downstream of the intercooler 23 with respect to the flow of intake air, as one of mounted temperature sensors, namely, temperature sensors mounted in the internal combustion engine 100. The upstream temperature sensor 27 detects a temperature of intake air flowing through the intake passage 20 at a location where the upstream temperature sensor 27 is installed, as an upstream detected temperature TU. A throttle valve 24 that adjusts the flow rate of intake air is arranged in the intake passage 20 downstream of the upstream temperature sensor 27 with respect to the flow of intake air. A downstream temperature sensor 25 as another one of the mounted temperature sensors is attached to the intake passage 20 downstream of the throttle valve 24 with respect to the flow of intake air. The downstream temperature sensor 25 detects a temperature of intake air flowing through the intake passage 20 at a location where the downstream temperature sensor 25 is installed, as a downstream detected temperature TD. A fuel injection valve 26 that injects fuel is attached to the intake passage 20 downstream of the downstream temperature sensor 25 with respect to the flow of intake air.

A bypass passage 44 extends from the exhaust passage 30 upstream of the turbine 42 of the supercharger 40 with respect to the flow of exhaust gas. The bypass passage 44 is connected to the exhaust passage 30 downstream of the turbine 42 with respect to the flow of exhaust gas. That is, the bypass passage 44 bypasses the turbine 42. A waste gate valve 46 that adjusts the flow rate of exhaust gas flowing through the bypass passage 44 is provided midway in the bypass passage 44.

An EGR passage 50 for recirculating exhaust gas to the intake passage 20 extends from the exhaust passage 30 upstream of the turbine 42 of the supercharger 40 with respect to the flow of exhaust gas and upstream of a location where the exhaust passage 30 is connected to the bypass passage 44 with respect to the flow of exhaust gas. The EGR passage 50 is connected to the intake passage 20 in a region between the downstream temperature sensor 25 and the fuel injection valve 26. More specifically, the EGR passage 50 is connected to the intake passage 20 in the vicinity of the downstream temperature sensor 25.

An EGR valve 52 that adjusts the flow rate of EGR gas as exhaust gas returned to the intake passage 20 through the EGR passage 50 is arranged midway in the EGR passage 50. The opening degree of the EGR valve 52 can be adjusted. Incidentally, the flow rate of EGR gas is an amount of EGR gas passing through a unit area per unit time. An EGR cooler 56 that cools EGR gas flowing through the EGR passage 50 is provided in the EGR passage 50 on the intake passage 20 side from the EGR valve 52. An EGR temperature sensor 54 as the other mounted temperature sensor is attached to the EGR passage 50 on the intake passage 20 side from the EGR cooler 56. The EGR temperature sensor 54 detects a temperature of EGR gas flowing through the EGR passage 50 at a location where the EGR temperature sensor 54 is installed, as an EGR detected temperature TE. Incidentally, the EGR temperature sensor 54 is a sensor utilizing a temperature-measuring resistor. The same holds true for the upstream temperature sensor 27 and the downstream temperature sensor 25.

Although not shown in FIG. 1, a water jacket is defined in the internal combustion engine 100, as a passage of coolant for cooling the internal combustion engine 100. A coolant temperature sensor 17 that detects a temperature of coolant as a detected coolant temperature WH is arranged at a downstream end of this water jacket. Incidentally, the coolant temperature sensor 17 is shown in the vicinity of the cylinder 11 in FIG. 1. Besides, although not shown in FIG. 1, the internal combustion engine 100 is provided with a starter motor that carries out cranking by rotating the crankshaft 15 in starting up the internal combustion engine 100.

Next, the control configuration of the internal combustion engine will be described. The internal combustion engine 100 is controlled by the control device 60. The control device 60 can be configured as one or more processors that perform various processes according to a computer program (software). Incidentally, the control device 60 may be configured as one or more dedicated hardware circuits such as an application specific integrated circuit and the like that perform at least one of the various processes, or a circuitry including a combination thereof. Each of the processors includes a CPU, and memories such as a RAM and a ROM. The memories store a program code or command that is configured to cause the CPU to perform the processes. The memories, that is, computer-readable media include all available media that can be accessed by a general-purpose or dedicated computer. Besides, the control device 60 is configured to include a non-volatile storage unit.

Detection signals from various sensors attached to the internal combustion engine 100 are input to the control device 60. In concrete terms, detection signals of the following parameters are input to the control device 60.

These parameters are the detected intake air amount GA detected by the airflow meter 22, the upstream detected temperature TU detected by the upstream temperature sensor 27, the downstream detected temperature TD detected by the downstream temperature sensor 25, the EGR detected temperature TE detected by the EGR temperature sensor 54, the detected crank position SC detected by the crank angle sensor 13, and the detected coolant temperature WH detected by the coolant temperature sensor 17. The control device 60 calculates an engine rotational speed NE as a rotational speed of the crankshaft 15 per unit time, based on the detected crank position SC. Besides, the control device 60 calculates an engine load factor KL based on the engine rotational speed NE and the detected intake air amount GA. The engine load factor KL represents a ratio of a current cylinder inflow air amount to a cylinder inflow air amount at the time when the internal combustion engine 100 is in steady operation with the throttle valve 24 fully open at the current engine rotational speed NE. Incidentally, the cylinder inflow air amount is an amount of intake air flowing into each of the cylinders 11 in an intake stroke.

The control device 60 is equipped with a control performance unit 62 that performs various kinds of engine control such as fuel injection control of the fuel injection valve 26 and ignition timing control of the ignition plug 14. The control performance unit 62 performs EGR valve control for controlling the opening degree of the EGR valve 52 as part of such engine control. In concrete teams, the control performance unit 62 calculates a target EGR gas amount Mg as a target value of a flow rate of EGR gas based on the engine rotational speed NE and the engine load factor KL, and controls the EGR valve 52 such that the flow rate of EGR gas flowing through the EGR passage 50 becomes equal to the target EGR gas amount Mg.

The control device 60 is equipped with a soaking time measurement unit 64 that measures a soaking time S as an elapsed time from a timing when the internal combustion engine 100 is stopped in response to the turning off of an ignition switch to a timing when the control device 60 is then activated in response to the turning on of the ignition switch. The soaking time measurement unit 64 measures the soaking time S every time the internal combustion engine 100 is stopped. Incidentally, the internal combustion engine 100 is stopped at a timing when, for example, the crankshaft 15 is stopped from rotating.

The control device 60 is equipped with a correction value calculation unit 66 that calculates a correction value for correcting the temperature detected by each of the mounted temperature sensors. It should be noted herein that the downstream temperature sensor 25 has a product tolerance. The product tolerance is an individual difference among temperatures detected by temperature sensors of the same type in a brand-new state. By the same token, the upstream temperature sensor 27 and the EGR temperature sensor 54 also have product tolerances respectively. The mounted temperature sensors have product tolerances respectively, so the temperature detected by each of the mounted temperature sensors may differ even in the case where that one of the mounted temperature sensors is designed to detect the same temperature. That is, the temperature detected by each of the mounted temperature sensors may include an error peculiar to that one of the mounted temperature sensors resulting from the production tolerance. The correction value calculation unit 66 calculates such a correction value for correcting an error peculiar to each of the mounted temperature sensors.

The correction value calculation unit 66 calculates an amount of deviation of the temperature detected by each of the mounted temperature sensors at the time when the control device 60 is activated after the lapse of a prescribed time SZ or more since stoppage of the internal combustion engine 100, namely, when the control device 60 is activated in the case where the soaking time S is equal to or longer than the prescribed time SZ, from a reference temperature TH, as a correction temperature of that one of the mounted temperature sensors. In concrete terms, the correction value calculation unit 66 calculates an amount of deviation of the upstream detected temperature TU from the reference temperature TH, as an upstream correction temperature TUa. Besides, the correction value calculation unit 66 calculates an amount of deviation of the downstream detected temperature TD from the reference temperature TH, as a downstream correction temperature TDa. Besides, the correction value calculation unit 66 calculates an amount of deviation of the EGR detected temperature TE from the reference temperature TH, as an EGR correction temperature TEa. Until the correction temperature of each of the mounted temperature sensors is updated, the correction value calculation unit 66 continues to hold that one of the existing correction temperatures. The reference temperature TH is determined as a temperature of air outside the vehicle 300. In the present embodiment, the correction value calculation unit 66 determines a median of the upstream detected temperature TU, the downstream detected temperature TD, and the EGR detected temperature at the time when the control device 60 is activated with the soaking time S equal to or longer than the prescribed time SZ, as the reference temperature TH.

The control device 60 is equipped with a temperature correction unit 68 that corrects the temperature detected by each of the mounted temperature sensors. The temperature correction unit 68 calculates a corrected temperature of each of the mounted temperature sensors by correcting the temperature detected by that one of the mounted temperature sensors by the correction temperature of that one of the mounted temperature sensors, during operation of the internal combustion engine 100. That is, the temperature correction unit 68 calculates the downstream corrected temperature TDc by correcting the downstream detected temperature TD by the downstream correction temperature TDa. Besides, the temperature correction unit 68 calculates an upstream corrected temperature TUc by correcting the upstream detected temperature TU by the upstream correction temperature TUa. Besides, the temperature correction unit 68 calculates an EGR corrected temperature TEc by correcting the EGR detected temperature TE by the EGR correction temperature TEa.

The control device 60 is equipped with a gas amount calculation unit 70 that calculates an estimated EGR gas amount Mx as an estimated value of the flow rate of EGR gas. The gas amount calculation unit 70 calculates the estimated EGR gas amount Mx based on the corrected temperature of each of the mounted temperature sensors and the detected intake air amount GA.

The control device 60 is equipped with a clogging detection unit 72 that detects the clogging of the EGR passage 50. The clogging of the EGR passage 50 means that EGR gas is unlikely to flow through the EGR passage 50 due to the presence of foreign matters and the like therein. The foreign matters causing the clogging of the EGR passage 50 are, for example, deposits that are generated through the cooling of HC components contained in exhaust gas by the EGR cooler. When the target EGR gas amount Mg is equal to or larger than a predetermined amount Ma, the clogging detection unit 72 detects the clogging of the EGR passage 50 based on a difference between the target EGR amount Mg and the estimated EGR gas amount Mx. More specifically, the clogging detection unit 72 detects the clogging of the EGR passage 50 when the estimated EGR gas amount remains smaller than the target EGR gas amount Mg. The clogging detection unit 72 calculates a divergence duration time H indicating a duration time of a situation where the estimated EGR gas amount is smaller than the target EGR gas amount Mg. The divergence duration time H is equal to 0 upon activation of the control device 60.

The control device 60 is equipped with a warning lamp control unit 74 that controls a warning lamp 81 that is provided in the vehicle 300 to provide information on the clogging of the EGR passage 50. The warning lamp 81 is, for example, an indicator lamp built in a meter panel in a cabin. When a signal for turning on the warning lamp 81 is input to the warning lamp control unit 74, the warning lamp control unit 74 turns on the warning lamp 81. When a signal for turning off the warning lamp 81 is input to the warning lamp control unit 74, the warning lamp control unit 74 turns off the warning lamp 81. The signal for turning on the warning lamp 81 is input to the warning lamp control unit 74 in a clogging detection process that will be described later. The signal for turning off the warning lamp 81 is input to the warning lamp control unit 74 when it is detected that the EGR passage 50 is no longer clogged as a result of, for example, the maintenance or the like of the vehicle 300.

Next, the clogging detection process that is performed by the control device 60 will be described. The correction value calculation unit 66, the temperature correction unit 68, the gas amount calculation unit 70, and the clogging detection unit 72 repeatedly perform the clogging detection process for detecting the clogging of the EGR passage 50 on a control cycle HZ, from a timing when the control device 60 is activated in response to the turning on of the ignition switch to a timing when the internal combustion engine 100 is stopped in response to the turning off of the ignition switch. The control cycle HZ is, for example, 10 seconds. In the present embodiment, the control device 60 starts up the internal combustion engine 100 within the control cycle HZ from activation of the control device 60, and the starter motor starts cranking.

Figure 2:
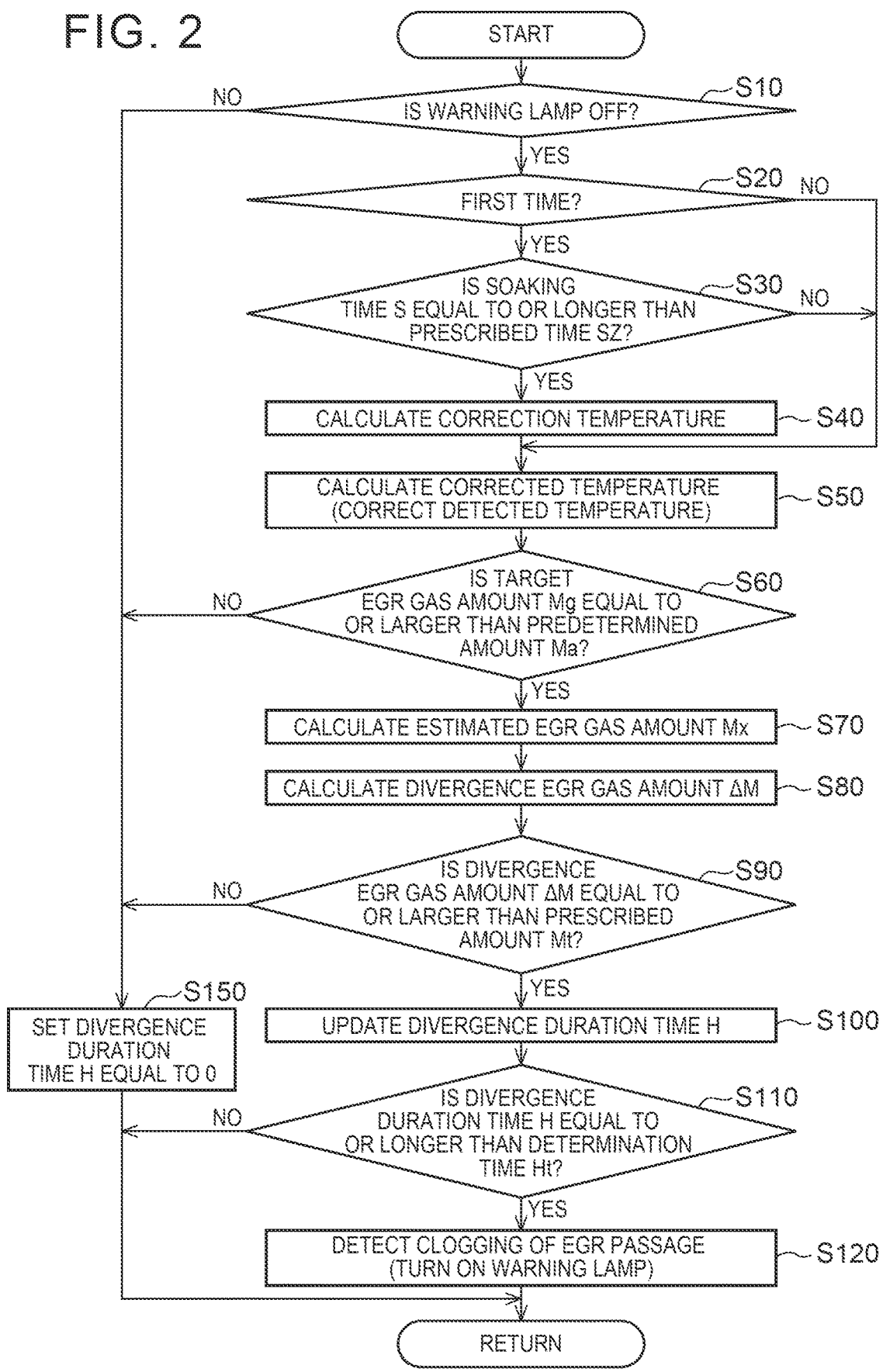
FIG. 2 is a flowchart representing a processing procedure of a clogging detection process.

As shown in FIG. 2, when the control device 60 is activated, the correction value calculation unit 66 starts the clogging detection process and performs the processing of step S10. In step S10, the correction value calculation unit 66 determines whether or not the warning lamp 81 is off. If the warning lamp 81 is on (NO in step S10), the correction value calculation unit 66 advances the process to step S150. Then in step S150, the clogging detection unit 72 calculates the divergence duration time H as 0. Then, the clogging detection unit 72 temporarily ends a series of processing steps of the clogging detection process. In this case, the correction value calculation unit 66 performs the processing of step S10 again.

On the other hand, if the warning lamp 81 is off in step S10 (YES in step S10), the correction value calculation unit 66 advances the process to step S20. In step S20, the correction value calculation unit 66 determines whether or not the current clogging detection process is performed for the first time after the ignition is turned on, namely, whether or not the current clogging detection process is performed for the first time after activation of the control device 60. If the current clogging detection process is performed at least for the second time after activation of the control device 60 (NO in step S20), the correction value calculation unit 66 skips the later-described processing of step S30 and the later-described processing of step S40, and advances the process to step S50 that will be described later. On the other hand, if the current clogging detection process is performed for the first time after activation of the control device 60 (YES in step S20), the correction value calculation unit 66 advances the process to step S30.

In step S30, the correction value calculation unit 66 determines whether or not the latest soaking time S is equal to or longer than the prescribed time SZ. In concrete terms, the correction value calculation unit 66 acquires the latest soaking time S calculated by the soaking time measurement unit 64, namely, a stop time before the current activation of the control device 60. Besides, the correction value calculation unit 66 stores the prescribed time SZ in advance. The prescribed time SZ is determined through an experiment or simulation as a time that is needed for the internal combustion engine 100 to return to a cold state before warm-up as the temperature of the internal combustion engine 100 falls when the internal combustion engine 100 is stopped. The prescribed time SZ is, for example, eight hours.

If the soaking time S is shorter than the prescribed time SZ in step S30 (NO in step S30), the correction value calculation unit 66 skips the later-described processing of step S40, and advances the process to step S50 that will be described later. On the other hand, if the soaking time S is equal to or longer than the prescribed time SZ in step S30 (YES in step S30), the correction value calculation unit 66 advances the process to step S40.

In step S40, the correction value calculation unit 66 calculates a correction temperature of each of the mounted temperature sensors. As described above, the processing of step S40 is the clogging detection process that is performed for the first time after activation of the control device 60, and is performed only when the soaking time S is equal to or longer than the prescribed time SZ. First of all, the correction value calculation unit 66 acquires the latest upstream detected temperature TU, the latest downstream detected temperature TD, and the latest EGR detected temperature TE. The temperature detected by each of the mounted temperature sensors that is acquired by the correction value calculation unit 66 at this time is the temperature detected by that one of the mounted temperature sensors at the time when the control device 60 is activated after the lapse of the prescribed time SZ or more since stoppage of the internal combustion engine 100. Then, the correction value calculation unit 66 calculates a median of the upstream detected temperature TU, the downstream detected temperature TD, and the EGR detected temperature TE as the reference temperature TH. Then, the correction value calculation unit 66 calculates a value obtained by subtracting the reference temperature TH from the upstream detected temperature TU, as the upstream correction temperature TUa, as indicated by an equation (1a) shown below.

$$TUa = TU - TH \tag{1a}$$

Besides, the correction value calculation unit 66 calculates a value obtained by subtracting the reference temperature TH from the downstream detected temperature TD, as the downstream correction temperature TDa, as indicated by an equation (1b) shown below.

$$TDa = TD - TH \tag{1b}$$

Besides, the correction value calculation unit 66 calculates a value obtained by subtracting the reference temperature TH from the EGR detected temperature TE, as the EGR correction temperature TEa, as indicated by an equation (1c) shown below $$TEa = TE - TH \quad (1c)$$

After calculating the correction temperature of each of the mounted temperature sensors, the correction value calculation unit 66 advances the process to step S50.

In step S50, the temperature correction unit 68 corrects the temperature detected by each of the mounted temperature sensors by the correction temperature of that one of the mounted temperature sensors. Incidentally, the processing of step S50 is performed each time during operation of the internal combustion engine 100 when the warning lamp 81 is off. The temperature correction unit 68 acquires the latest upstream detected temperature TU, the latest downstream detected temperature TD, and the latest EGR detected temperature TE. Besides, the temperature correction unit 68 acquires the upstream correction temperature TUa, the downstream correction temperature TDa, and the EGR correction temperature TEa that are currently kept by the correction value calculation unit 66. Then, the temperature correction unit 68 calculates a value obtained by adding the upstream correction temperature TUa to the upstream detected temperature TU, as the upstream corrected temperature TUc, as indicated by an equation (2a) shown below.

$$TUc = TU + TUa \quad (2a)$$

Besides, the temperature correction unit 68 calculates a value obtained by adding the downstream correction temperature TDa to the downstream detected temperature TD, as the downstream corrected temperature TDc, as indicated by an equation (2b) shown below.

$$TDc = TD + TDa \quad (2b)$$

Besides, the temperature correction unit 68 calculates a value obtained by adding the EGR correction temperature TEa to the EGR detected temperature TE, as the EGR corrected temperature TEc, as indicated by an equation (2c) shown below.

$$TEc = TE + TEa \quad (2c)$$

After calculating the corrected temperature of each of the mounted temperature sensors, the temperature correction unit 68 advances the process to step S60.

In step S60, the clogging detection unit 72 determines whether or not the target EGR gas amount Mg is equal to or larger than the predetermined amount Ma. In making this determination, the clogging detection unit 72 acquires the latest target EGR gas amount Mg calculated by the control performance unit 62. Besides, the clogging detection unit 72 stores the predetermined amount Ma in advance. It should be noted herein that under the circumstances where the target EGR gas amount Mg is reasonably small, even if the estimated EGR gas amount Mx is smaller than the target EGR gas amount Mg, it is difficult to find out whether the difference between the estimated EGR gas amount Mx and the target EGR gas amount Mg results from the clogging of the EGR passage 50 or other factors. As these factors, it is possible to mention, for example, an error in adjustment of the opening degree of the EGR valve 52 and an error in the estimated EGR gas amount Mx. The predetermined amount Ma is determined through an experiment or simulation as a value that makes it possible to determine that the difference between the target EGR gas amount Mg and the estimated EGR gas amount Mx results from the clogging of the EGR passage 50.

If the target EGR gas amount Mg is smaller than the predetermined amount Ma in step S60 (NO in step S60), the clogging detection unit 72 advances the process to step S150. Then, the clogging detection unit 72 passes through the processing of step S150, and temporarily ends the series of processing steps of the clogging detection process. In this case, the correction value calculation unit 66 performs the processing of step S10 again.

On the other hand, if the target EGR gas amount Mg is equal to or larger than the predetermined amount Ma (YES in step S60), the clogging detection unit 72 advances the process to step S70. In step S70, the gas amount calculation unit 70 calculates the estimated EGR gas amount Mx. In calculating the estimated EGR gas amount Mx, the gas amount calculation unit 70 first calculates a peripheral influence temperature TS. The peripheral influence temperature TS is an estimated value of a temperature at which the temperature of the atmosphere of the internal combustion engine 100 outside the intake passage 20 is transferred to the interior of the intake passage 20. The gas amount calculation unit 70 stores in advance a peripheral influence temperature map representing a relationship among the engine rotational speed NE, the engine load factor KL, and the peripheral influence temperature TS. This peripheral influence temperature map is created for each temperature of the coolant in the water jacket. In the peripheral influence temperature map, as a rule, the peripheral influence temperature TS rises as the engine rotational speed NE rises and as the engine load factor KL increases. Besides, a comparison between the peripheral influence temperature TS at the time when the coolant temperature is high and the peripheral influence temperature TS at the time when the coolant temperature is low at the same engine rotational speed NE and the same engine load factor KL reveals that the former is higher than the later. The gas amount calculation unit 70 acquires the latest engine rotational speed NE, the latest engine load factor KL, and the latest detected coolant temperature WH. Then, the gas amount calculation unit 70 refers to the peripheral influence temperature map corresponding to the detected coolant temperature WH, and calculates the peripheral influence temperature TS corresponding to the engine rotational speed NE and the engine load factor KL based on the peripheral influence temperature map.

After calculating the peripheral influence temperature TS, the gas amount calculation unit 70 acquires the upstream corrected temperature TUc, the downstream corrected temperature TDc, and the EGR corrected temperature TEc that are calculated by the temperature correction unit 68 in step S50. Besides, the gas amount calculation unit 70 calculates the latest detected intake air amount GA. Then, the gas amount calculation unit 70 calculates the estimated EGR gas amount Mx by dividing the product of the detected intake air amount GA and a value obtained by subtracting the upstream corrected temperature TUc and the peripheral influence temperature TS from the downstream corrected temperature TDc by a value obtained by subtracting the downstream corrected temperature TDc from the EGR corrected temperature TEc, as indicated by an equation (3) shown below.

$$Mx = (TDc - TUc - TS) \times GA/(TEc - TDc) \quad (3)$$

After calculating the estimated EGR gas amount Mx, the gas amount calculation unit 70 advances the process to step S80.

In step S80, the clogging detection unit 72 calculates a divergence EGR gas amount ΔM as a difference between the target EGR gas amount Mg and the estimated EGR gas amount Mx. In concrete terms, the clogging detection unit 72 acquires the latest target EGR gas amount Mg calculated by the control performance unit 62. Besides, the clogging detection unit 72 acquires the estimated EGR gas amount Mx calculated by the gas amount calculation unit 70 in step S70. Then, the clogging detection unit 72 calculates the divergence EGR gas amount ΔM as a value obtained by subtracting the estimated EGR gas amount Mx from the target EGR gas amount Mg. After that, the clogging detection unit 72 advances the process to step S90.

In step S90, the clogging detection unit 72 determines whether or not the divergence EGR gas amount ΔM calculated in step S80 is equal to or larger than a prescribed amount Mt. The clogging detection unit 72 stores the prescribed amount Mt in advance. The prescribed amount Mt is determined through an experiment or simulation in association with a determination time Ht utilized in step S110 that will be described later. That is, the prescribed amount Mt and the determination time Ht are determined as values that make it possible to determine that the EGR passage 50 is clogged when the divergence EGR gas amount ΔM remains equal to or larger than the prescribed amount Mt for the determination time Ht or more. The prescribed amount Mt is a positive value. If the divergence EGR gas amount ΔM is smaller than the prescribed amount Mt (NO in step S90), the clogging detection unit 72 passes through the processing of step S150, and temporarily ends the series of processing steps of the clogging detection process. In this case, the correction value calculation unit 66 performs the processing of step S10 again.

On the other hand, if the divergence EGR gas amount ΔM is equal to or larger than the prescribed amount Mt (YES in step S90), the clogging detection unit 72 advances the process to step S100. In step S100, the clogging detection unit 72 updates the divergence duration time H. In concrete terms, the clogging detection unit 72 adds the length of the control cycle HZ as a cycle of performance of the clogging detection process to the currently held divergence duration time H, namely, the divergence duration time H at the time of the last performance of the clogging detection process. After that, the clogging detection unit 72 advances the process to step S110.

In step S110, the clogging detection unit 72 determines whether or not the divergence duration time H is equal to or longer than the determination time Ht. The clogging detection unit 72 stores the determination time Ht in advance. As described above, the determination time Ht is determined through an experiment or simulation. If the divergence duration time H is shorter than the determination time Ht (NO in step S110), the clogging detection unit 72 temporarily ends the series of processing steps of the clogging detection process. In this case, the correction value calculation unit 66 performs the processing of step S10 again.

On the other hand, if the divergence duration time H is equal to or longer than the determination time Ht (YES in step S110), the clogging detection unit 72 advances the process to step S120. In step S120, the clogging detection unit 72 detects the clogging of the EGR passage 50. Then, the clogging detection unit 72 outputs a signal for turning on the warning lamp 81. After that, the clogging detection unit 72 temporarily ends the series of processing steps of the clogging detection process. After that, the correction value calculation unit 66 performs the processing of step S10 again.

Next, the operation of the present embodiment will be described. In the clogging detection process, the correction value for correcting the error peculiar to each of the mounted temperature sensors is calculated. In concrete terms, if the control device 60 is activated in the situation where the soaking time S is equal to or longer than the prescribed time SZ (YES in step S20 and YES in step S30), the correction temperature of each of the mounted temperature sensors is calculated (step S40). It should be noted herein that when the soaking time S is equal to or longer than the prescribed time SZ, the internal combustion engine 100 has been sufficiently cooled, and the temperatures of the intake passage 20 and the EGR passage 50 are approximately equal to the temperature of outside air. That is, the temperatures of the locations where the mounted temperature sensors are arranged respectively ought to be equal to one another. In the processing of step S40, the amount of deviation of the temperature detected by each of the mounted temperature sensors under these circumstances from the reference temperature TH is calculated as the correction temperature of that one of the mounted temperature sensors. At this time, the median of the temperatures detected by the three mounted temperature sensors is regarded as a true value, namely, an actual temperature of air outside the vehicle 300. This median is set as the reference temperature TH.

During operation of the internal combustion engine 100, the temperature detected by each of the mounted temperature sensors is corrected each time by the correction temperature of that one of the mounted temperature sensors calculated as described above (step S50). Then, when the target EGR gas amount Mg is equal to or larger than the predetermined amount Ma, the estimated EGR gas amount Mx is calculated by the corrected temperatures (step S70). Incidentally, when the control device 60 is activated in the situation where the soaking time S is shorter than the prescribed time SZ (NO in step S30), the corrected temperatures are not updated. In this case, the detected temperatures are corrected through the use of the existing correction temperatures respectively during operation of the internal combustion engine 100. The existing correction temperatures are the correction temperatures calculated when the soaking time S was equal to or longer than the prescribed time SZ before, respectively.

Incidentally, the estimated EGR gas amount Mx calculated in step S70 is calculated based on a thermal relationship at the time when the EGR gas returned to the intake passage 20 is mixed with intake air. This thermal relationship indicates that an amount F1 of heat received by intake air from EGR gas and an amount F2 of heat dissipated by EGR gas are equal to each other. This thermal relationship is based on the law of energy conservation.

The amount F1 of heat received by intake air from EGR gas can be expressed by a temperature P1 in a state where EGR gas is mixed with intake air, a temperature P2 before mixing EGR gas with intake air, the peripheral influence temperature TS, and the detected intake air amount GA. In concrete terms, the amount F1 of heat received by intake air from EGR gas can be expressed as the product of the detected intake air amount GA and a value obtained by subtracting the temperature P2 before mixing EGR gas with intake air and the peripheral influence temperature TS from the temperature P1 in the state where EGR gas is mixed with intake air, as indicated by an equation (4a) shown below.

$$F1=(P1-P2-TS) \times GA \qquad (4a)$$

It should be noted herein that the downstream corrected temperature TDc reflects the temperature P1 in the state where EGR gas is mixed with intake air. Besides, the upstream corrected temperature TUc reflects the temperature P2 before mixing EGR gas with intake air. Accordingly, in the equation (4a), it is possible to substitute the downstream corrected temperature TDc for the temperature P1 in the state where EGR gas is mixed with intake air, and substitute the upstream corrected temperature TUc for the temperature P2 before mixing EGR gas with intake air. That is, the amount F1 of heat received by intake air from EGR gas can be expressed as the product of the detected intake air amount GA and a value obtained by subtracting the upstream corrected temperature TUc and the peripheral influence temperature TS from the downstream corrected temperature TDc, as indicated by an equation (4b) shown below.

$$F1=(TDc-TUc-TS) \times GA \qquad (4b)$$

On the other hand, the amount F2 of heat dissipated by EGR gas can be expressed by a temperature P3 of EGR gas that has not been mixed with intake air yet, the temperature P1 in the state where EGR gas is mixed with intake air, and a flow rate Mz of EGR gas. In concrete terms, the amount F2 of heat dissipated by EGR gas can be expressed as the product of the flow rate Mz of EGR gas and a value obtained by subtracting the temperature P1 in the state where EGR gas is mixed with intake air from the temperature P3 of EGR gas that has not been mixed with intake air yet, as indicated by an equation (5a) shown below.

$$F2=(P3-P1) \times Mz \qquad (5a)$$

It should be noted herein that the EGR corrected temperature TEc reflects the temperature of EGR gas that has not been mixed with intake air yet. Besides, as described above, the downstream corrected temperature TDc reflects the temperature P1 in the state where EGR gas is mixed with intake air. Accordingly, in the equation (5a), it is possible to substitute the EGR corrected temperature TEc for the temperature P3 of EGR gas that has not been mixed with intake air yet, and substitute the downstream corrected temperature TDc for the temperature P1 in the state where EGR gas is mixed with intake air. That is, the amount F2 of heat dissipated by EGR gas can be expressed as the product of the flow rate Mz of EGR gas and a value obtained by subtracting the downstream corrected temperature TDc from the EGR corrected temperature TEc, as indicated by an equation (5b) shown below.

$$F2=(TEc-TDc) \times Mz \qquad (5b)$$

As described above, the relationship indicating that the amount F1 of heat received by intake air from EGR gas and the amount F2 of heat dissipated by EGR gas are equal to each other is established, so a relational expression expressed by the equation (3) can be derived from the equation (4b) and the equation (5b). In step S70 of the clogging detection process, the estimated EGR gas amount Mx is calculated through the use of the relational expression expressed by the equation (3) thus derived.

When the estimated EGR gas amount Mx is calculated in step S70, the clogging of the EGR passage 50 is detected based on a divergence of the estimated EGR gas amount Mx from the target EGR gas amount Mg (steps S80 to S120). In concrete terms, if the estimated EGR gas amount Mx remains smaller than the target EGR gas amount Mg by the prescribed amount Mt or more for the determination time Ht or more (YES in step S90 and YES in step S110), the clogging of the EGR passage 50 is detected (step S120). When the clogging of the EGR passage 50 is detected, the warning lamp 81 is turned on.

Next, effects of the present embodiment will be described.

(1) In the foregoing configuration, the downstream temperature sensor 25 is arranged in the intake passage 20 in the vicinity of the location where the EGR passage 50 is connected to the intake passage 20. Therefore, the downstream temperature sensor 25 can detect the temperature in the state where EGR gas is mixed with intake air. Besides, the upstream temperature sensor 27 is arranged in the intake passage 20 downstream of the intercooler 23 with respect to the flow of intake air. Therefore, the upstream temperature sensor 27 can detect the temperature of intake air that has been cooled by the intercooler 23 and with which EGR gas has not been mixed yet. Besides, the EGR temperature sensor 54 is arranged in the EGR passage 50 on the intake passage 20 side from the EGR cooler 56. Therefore, the EGR temperature sensor 54 can detect the temperature of EGR gas that has been cooled by the EGR cooler 56 and that has not been mixed with intake air yet. In this manner, in the foregoing configuration, each of the mounted temperature sensors is arranged at the position that is suited to calculate the estimated EGR gas amount Mx based on the thermal relationship in mixing EGR gas and intake air with each other. By utilizing the temperature thus detected by each of the mounted temperature sensors, the estimated EGR gas amount Mx can be calculated through the use of the relational expression based on the foregoing thermal relationship.

It should be noted herein that when the estimated EGR gas amount Mx is calculated by directly applying the detected temperature including the error peculiar to each of the mounted temperature sensors to the relational expression in calculating the estimated EGR gas amount Mx through the use of the relational expression based on the foregoing thermal relationship, the accuracy of the estimated EGR gas amount Mx becomes low. In this respect, according to the foregoing configuration, the estimated EGR gas amount is calculated by the value obtained by correcting the error peculiar to each of the mounted temperature sensors. Accordingly, the accuracy of the estimated EGR gas amount Mx is high. Therefore, the accuracy in detecting the clogging of the EGR passage 50 is high.

(2) The volume of the EGR cooler 56 is reasonably large. Therefore, if the EGR valve is arranged in the EGR passage on the intake passage side from the EGR cooler, the volume of the EGR passage in the region located on the exhaust passage side from the EGR valve is large. In this case, when the EGR valve is closed, gas is allowed to pulsate in the EGR passage in the region located on the exhaust passage side from the EGR valve. When this pulsation is transferred to the turbine in the exhaust passage, the turbine is prevented from rotating, so the supercharging efficiency may fall. In this respect, according to the foregoing configuration, the EGR valve 52 is arranged in the EGR passage 50 on the exhaust passage 30 side from the EGR cooler 56, so the supercharging efficiency can be kept from falling.

Incidentally, the pressure in the EGR passage may be utilized in estimating the flow rate of EGR gas. In concrete terms, a differential pressure across the EGR valve is detected with the EGR valve regarded as a throttle portion in the EGR passage. As described above, in the foregoing configuration, the EGR valve 52 is arranged in the EGR passage 50 on the exhaust passage 30 side from the EGR cooler 56. Thus, the temperature around the EGR valve 52 is very high. Therefore, in arranging a pressure sensor around the EGR valve 52 with a view to detecting the differential pressure across the EGR valve 52, the pressure sensor is required to exhibit very high heat resistance, so it is in fact difficult to install the pressure sensor.

In this respect, when the estimated EGR gas amount Mx is calculated through the use of the temperatures, there is no restriction on the position of the EGR temperature sensor 54 with respect to the position of the EGR valve 52. Therefore, the EGR temperature sensor 54 is allowed to be arranged in the EGR passage 50 on the intake passage 20 side from the EGR cooler 56. The temperature of the EGR passage 50 is lower on the intake passage 20 side from the EGR cooler 56 than on the exhaust passage 30 side from the EGR cooler 56, so the EGR temperature sensor 54 is not required to exhibit high heat resistance. Accordingly, the EGR temperature sensor 54 can be arranged at the position suited to detect the temperature of EGR gas that has been cooled by the EGR cooler 56, namely, on the intake passage 20 side from the EGR cooler 56.

(3) In the foregoing configuration, the median of the upstream detected temperature TU, the downstream detected temperature TD, and the EGR detected temperature TE at the time when the control device 60 is activated after the lapse of the prescribed time SZ or more since stoppage of the internal combustion engine 100 is adopted as the reference temperature TH. That is, one of the three detected temperatures is adopted as the reference temperature TH. In this case, even if there are reasonably large errors in the other two detected temperatures, the reference temperature TH is not affected by the errors. Therefore, the error in the reference temperature TH with respect to the actual temperature of air outside the vehicle 300 can be made small.

Incidentally, the present embodiment can be carried out after being modified as follows. The present embodiment and the following modification examples can be carried out in combination with one another within such a range that no technical contradiction occurs. The method of setting the reference temperature TH is not limited to the example of the foregoing embodiment. For example, the average of the upstream detected temperature TU, the downstream detected temperature TD, and the EGR detected temperature TE at the time when the control device 60 is activated in the situation where the soaking time S is equal to or longer than the prescribed time SZ may be adopted as the reference temperature TH. The average of the temperatures detected by the three mounted temperature sensors is likely to make the errors in the three mounted temperature sensors counterbalance one another, so the error in the reference temperature TH with respect to the actual temperature of air outside the vehicle 300 can be made small.

The upstream temperature sensor 27, the downstream temperature sensor 25, and the EGR temperature sensor 54 are different in type from one another, and are hence different in product tolerance from one another. It should be noted herein that the temperatures to be detected by the upstream temperature sensor 27 and the downstream temperature sensor 25 are lower than the temperature to be detected by the EGR temperature sensor 54. In the case where each of the mounted temperature sensors is a sensor utilizing a temperature-measuring resistor, as the temperature to be detected falls, the resistance value needed to detect the temperature increases, and the product tolerance of the resistor having the resistance value rises. That is, among the three mounted temperature sensors, the product tolerance of the EGR temperature sensor 54 is the lowest. Thus, among these three mounted temperature sensors, the EGR temperature sensor 54 may be determined as a minimum tolerance temperature sensor, namely, a temperature sensor with the lowest product tolerance. Then, the temperature detected by the EGR temperature sensor 54 at the time when the control device 60 is activated in the situation where the soaking time S is equal to or longer than the prescribed time SZ may be adopted as the reference temperature TH. In the case of the EGR temperature sensor 54 as the minimum tolerance temperature sensor, the error peculiar to the temperature sensor is likely to be small. When the temperature detected by the EGR temperature sensor 54 is adopted as the reference temperature TH, the error in the reference temperature TH with respect to the actual temperature of air outside the vehicle 300 can be made small.

In the foregoing modification example regarding the minimum tolerance temperature sensor, in relation to the types of the mounted temperature sensors, the product tolerance of the upstream temperature sensor 27 or the downstream temperature sensor 25 can be the lowest among the three mounted temperature sensors. In this case, either of these temperature sensors may be adopted as the minimum tolerance temperature sensor. Then, the temperature detected by the temperature sensor determined as the minimum tolerance temperature sensor may be set as the reference temperature TH.

As the method of setting the reference temperature TH, the method utilizing the median of the three mounted temperature sensors as in the foregoing embodiment, and the method utilizing the product tolerance as in the foregoing modification examples may be combined with each other. For example, in the case where the product tolerance of the temperature sensor corresponding to the median is the highest among the three mounted temperature sensors in the configuration in which the median is basically set as the reference temperature TH, the temperature detected by the minimum tolerance temperature sensor may be adopted as the reference temperature TH instead of setting the median as the reference temperature TH.

The reference temperature TH may be set without utilizing the temperature detected by the upstream temperature sensor 27, the downstream temperature sensor 25, or the EGR temperature sensor 54, The reference temperature TH is required only to reflect the temperature of air outside the vehicle 300. For example, the reference temperature TH may be set through the use of the temperature detected by an outside air temperature sensor attached to the vehicle 300.

The method of correcting the temperature detected by each of the mounted temperature sensors by the correction temperature of that one of the mounted temperature sensors is not limited to addition. For example, the temperature detected by each of the mounted temperature sensors may be multiplied or divided by the correction temperature of that one of the mounted temperature sensors. If the detected temperature is corrected according to a method other than addition, it is appropriate to calculate the correction temperature such that the correction temperature becomes a value suitable for the method of correction. The correction temperature may not be the amount of deviation itself of the temperature detected by each of the mounted temperature sensors from the reference temperature TH, but may be based on the amount of deviation of the temperature detected by each of the mounted temperature sensors from the reference temperature TH.

The method of calculating the peripheral influence temperature TS is not limited to the example of the foregoing embodiment. The method of calculation does not matter as long as the temperature at which the temperature of the atmosphere of the internal combustion engine 100 outside the intake passage 20 is transferred to the interior of the intake passage 20 can be appropriately calculated as the peripheral influence temperature TS. For example, a temperature sensor may be arranged outside and around the intake passage 20, and the peripheral influence temperature TS may be calculated based on the temperature detected by the temperature sensor.

The method of calculating the estimated EGR gas amount Mx is not limited to the example of the foregoing embodiment. That is, it is not indispensable to calculate the estimated EGR gas amount Mx based on the thermal relationship regarding the mixture of EGR gas and intake air. If the method of calculating the estimated EGR gas amount Mx is based on the corrected temperature of each of the mounted temperature sensors and the detected intake air amount GA, the estimated EGR gas amount Mx can be accurately estimated by applying the art of the foregoing embodiment. As another mode of the method of calculating the estimated EGR gas amount Mx, for example, a map representing a relationship among the downstream corrected temperature TDc, the detected intake air amount GA, and a base value of the estimated EGR gas amount Mx may be created in advance. Then, after calculating the base value of the estimated EGR gas amount Mx based on the map, the eventual estimated EGR gas amount Mx may be calculated by correcting the base value by a difference between the downstream corrected temperature TDc and the upstream corrected temperature TUc and a difference between the downstream corrected temperature TDc and the EGR corrected temperature TEc.

The method of detecting the clogging of the EGR passage 50 as the processing contents of steps S80 to S120 in the clogging detection process is not limited to the example of the foregoing embodiment. In the method of detecting the clogging of the EGR passage 50, the clogging of the EGR passage 50 may be detected based on a difference between the estimated EGR gas amount Mx and the target EGR gas amount Mg, when the target EGR gas amount Mg is equal to or larger than the predetermined amount Ma. For example, the clogging of the EGR passage 50 may be immediately detected when the divergence EGR gas amount ΔM is reasonably large, without measuring the divergence duration time H. In the case where the divergence EGR gas amount ΔM is reasonably large, even if this is an instantaneous phenomenon, some abnormality in the clogging of the EGR passage 50 is considered to have been caused.

The predetermined amount Ma as a condition of detecting the clogging of the EGR passage 50 may be a positive value. When the clogging of the EGR passage 50 is detected, clogging information indicating that the clogging of the EGR passage 50 has been detected may be stored into the storage unit of the control device 60. If clogging information is stored into the storage unit, an operator can retrieve the clogging information in overhauling or inspecting the vehicle 300.

When the information on detection of the clogging of the EGR passage 50 is stored into the storage unit of the control device 60 as in the foregoing modification example, the provision of the information by the warning lamp 81 may be omitted. In this case, the processing of step S10 as the processing regarding the warning lamp 81 may also be omitted.

The general configuration of the internal combustion engine 100 is not limited to the example of the foregoing embodiment. For example, the position of the upstream temperature sensor 27 may be changed from the position in the foregoing embodiment. The upstream temperature sensor 27 may be arranged in the intake passage 20 upstream of the downstream temperature sensor 25 with respect to the flow of intake air. For example, the upstream temperature sensor 27 may be arranged in the intake passage 20 upstream of the intercooler 23 with respect to the flow of intake air. In this case, the temperature detected by the upstream temperature sensor 27 may be appropriately corrected so as to be able to be treated as a temperature of intake air that has been cooled by the intercooler 23 and with which EGR gas has not been mixed yet. Then, the value thus corrected may be treated as the upstream detected temperature TU in the foregoing embodiment. In this case, in the same manner as in the foregoing embodiment, the upstream detected temperature TU can be corrected based on the amount of deviation from the reference temperature TH, and the estimated EGR gas amount Mx can be calculated by the corrected value.

The position of the EGR temperature sensor 54 is not limited to the example of the foregoing embodiment. The EGR temperature sensor 54 is required only to be arranged on the EGR passage 50. When the EGR temperature sensor 54 exhibits reasonably high heat resistance, it is acceptable to arrange the EGR temperature sensor 54 in the EGR passage 50 on the exhaust passage 30 side from the EGR cooler 56. In this case, the temperature detected by the EGR temperature sensor 54 may be appropriately corrected so as to be able to be treated as a temperature of EGR gas that has been cooled by the EGR cooler 56 and that has not been mixed with intake air yet. Then, the value thus corrected may be treated as the EGR detected temperature TE in the foregoing embodiment. In this case, a process similar to that of the foregoing embodiment is applicable, as is the case with the foregoing modification example of the upstream temperature sensor 27.

The position of the downstream temperature sensor 25 is not limited to the example of the foregoing embodiment. That is, the downstream temperature sensor 25 may not be located in the vicinity of the location where the intake passage 20 and the EGR passage 50 are connected to each other. The downstream temperature sensor 25 is required only to be arranged in the intake passage downstream of the throttle valve. When the downstream temperature sensor 25 is arranged at a position reasonably distant from the vicinity of the location where the intake passage 20 and the EGR passage 50 are connected to each other, the temperature detected by the downstream temperature sensor 25 may be appropriately corrected so as to be able to be treated as a temperature in the state where EGR gas is mixed with intake air. Then, the value thus corrected may be treated as the downstream detected temperature TD in the foregoing embodiment. In this case, a process similar to that of the foregoing embodiment is applicable, as is the case with the foregoing modification examples of the upstream temperature sensor 27 and the EGR temperature sensor 54.

The supercharger 40 may be dispensed with. If the supercharger 40 is dispensed with, the bypass passage 44 and the intercooler 23 may be dispensed with. In this case, the upstream temperature sensor 27 is preferably arranged at a position that makes it possible to detect a temperature before mixing EGR gas with intake air. As this position, it is possible to mention, for example, a position in the intake passage 20 in the vicinity of the throttle valve 24 and upstream of the throttle valve 24 with respect to the flow of intake air.

The EGR cooler 56 may be dispensed with. In this case, the EGR temperature sensor 54 is preferably arranged at a position that makes it possible to detect a temperature of EGR gas that has not been mixed with intake air yet. As this position, it is possible to mention, for example, a position in the EGR passage 50 that is closer to the intake passage 20 than to the center in a direction in which the EGR passage 50 extends.

After activation of the control device 60, the control device 60 may start up the internal combustion engine 100 after the lapse of a time longer than the control cycle HZ. The timing for starting the clogging detection process for the first time after the turning on of the ignition switch is not limited to the example of the foregoing embodiment. The clogging detection process may be started for the first time at a timing between activation of the control device 60 and startup of the internal combustion engine 100 by the control device 60. For example, the clogging detection process may be started at the timing when the control device 60 starts up the internal combustion engine 100. When the soaking time S is equal to or longer than a prescribed time SK at the timing for starting the clogging detection process, the correction temperature of each of the mounted temperature sensors is calculated in the processing of step S40.

When the timing for starting the clogging detection process for the first time after the turning on of the ignition switch precedes startup of the internal combustion engine 100 by the control device 60, the clogging detection process may be awaited until the control device 60 starts up the internal combustion engine 100, after the clogging detection process is performed for the first time after the turning on of the ignition switch. Then, the clogging detection process may be resumed as the internal combustion engine 100 is started up. In this case, the clogging of the EGR passage 50 can be detected by correcting the temperature detected by each of the mounted temperature sensors during operation of the internal combustion engine 100, through the use of the correction temperature of that one of the mounted temperature sensors calculated in the clogging detection process performed for the first time.

What is claimed is:

1. An internal combustion engine control system comprising:
    an internal combustion engine; and
    a control device that controls the internal combustion engine, wherein
    the internal combustion engine is equipped with
    an EGR passage that extends from an exhaust passage and that is connected to an intake passage downstream of a throttle valve,
    a downstream temperature sensor that detects a temperature of intake air in the intake passage in a region downstream of the throttle valve,
    an upstream temperature sensor that detects a temperature of intake air in the intake passage in a region upstream of the downstream temperature sensor,
    an EGR temperature sensor that detects a temperature of EGR gas as exhaust gas returned to the intake passage through the EGR passage, and
    an airflow meter that detects a flow rate of intake air introduced into the intake passage, and
    the control device is equipped, when the downstream temperature sensor, the upstream temperature sensor, and the EGR temperature sensor are referred to as mounted temperature sensors, with
    a correction value calculation unit that calculates a correction temperature of each of the mounted temperature sensors based on an amount of deviation of a temperature detected by that one of the mounted temperature sensors at a predetermined timing between activation of the control device and startup of the internal combustion engine by the control device after lapse of a prescribed time or more since stoppage of the internal combustion engine, from a reference temperature determined as a temperature of air outside a vehicle,
    a temperature correction unit that calculates a corrected temperature of that one of the mounted temperature sensors by correcting the temperature detected by that one of the mounted temperature sensors by the correction temperature of that one of the mounted temperature sensors, during operation of the internal combustion engine,
    a gas amount calculation unit that calculates an estimated EGR gas amount as an estimated value of a flow rate of the EGR gas, based on the corrected temperature of that one of the mounted temperature sensors and the flow rate of intake air, and
    a clogging detection unit that detects clogging of the EGR passage based on a difference between a target EGR gas amount as a target value of the flow rate of the EGR gas and the estimated EGR gas amount, when the target EGR gas amount is equal to or larger than a predetermined amount.

2. The internal combustion engine control system according to claim 1, wherein
    the gas amount calculation unit calculates the estimated EGR gas amount based on a value obtained by dividing a product of the flow rate of intake air and a value obtained by subtracting the corrected temperature of the upstream temperature sensor from the corrected temperature of the downstream temperature sensor, by a value obtained by subtracting the corrected temperature of the downstream temperature sensor from the corrected temperature of the EGR temperature sensor.

3. The internal combustion engine control system according to claim 1, wherein
    a supercharger is provided across the intake passage and the exhaust passage,
    the EGR passage extends from the exhaust passage upstream of a turbine of the supercharger,
    an EGR valve that adjusts the flow rate of the EGR gas flowing through the EGR passage is provided midway in the EGR passage,
    an EGR cooler that cools the EGR gas flowing through the EGR passage is provided in the EGR passage on the intake passage side from the EGR valve, and
    the EGR temperature sensor is provided in the EGR passage on the intake passage side from the EGR cooler, in the internal combustion engine.

4. The internal combustion engine control system according to claim 3, wherein
    an intercooler that cools intake air is provided in the intake passage downstream of a compressor of the supercharger and upstream of the throttle valve, and
    the upstream temperature sensor is provided in the intake passage downstream of the intercooler, in the internal combustion engine.

5. The internal combustion engine control system according to claim 1, wherein
    the reference temperature is a median of the temperature detected by the downstream temperature sensor, the temperature detected by the upstream temperature sensor, and the temperature detected by the EGR temperature sensor at the predetermined timing after lapse of the prescribed time or more since stoppage of the internal combustion engine.

6. The internal combustion engine control system according to claim 1, wherein the reference temperature is an average of the temperature detected by the downstream temperature sensor, the temperature detected by the upstream temperature sensor, and the temperature detected by the EGR temperature sensor at the predetermined timing after lapse of the prescribed time or more since stoppage of the internal combustion engine.

7. The internal combustion engine control system according to claim 1, wherein the reference temperature is the temperature detected by a minimum tolerance temperature sensor at the predetermined timing after lapse of the prescribed time or more since stoppage of the internal combustion engine, when the minimum tolerance temperature sensor is defined as a temperature sensor with a lowest product tolerance among the downstream temperature sensor, the upstream temperature sensor, and the EGR temperature sensor.

\* \* \* \* \*